United States Patent [19]
Sellman

[11] 3,986,786
[45] Oct. 19, 1976

[54] WIND MOTORS

[76] Inventor: Donald L. Sellman, 407 S. 3rd St., Lincoln, Kans. 67455

[22] Filed: Dec. 1, 1975

[21] Appl. No.: 636,668

Related U.S. Application Data

[62] Division of Ser. No. 484,148, June 28, 1974.

[52] U.S. Cl. ................................................. 415/2
[51] Int. Cl.² ........................................... F03B 3/18
[58] Field of Search ................................. 415/2–4

[56] References Cited
UNITED STATES PATENTS

| | | | |
|---|---|---|---|
| 658,129 | 9/1900 | Stende | 415/2 |
| 757,800 | 4/1904 | Williams | 415/2 |
| 1,003,635 | 9/1911 | Melander | 415/4 |
| 1,534,799 | 4/1925 | Maine | 415/2 |
| 1,783,669 | 12/1930 | Oliver | 415/2 |

*Primary Examiner*—C. J. Husar

[57] ABSTRACT

Wind motors which are propelled by the impact of the wind against the vanes of an impeller wheel, that have wind channeling devices that gather the wind from a large area and funnel it at increased density and pressure to apply multiplied impact against the impeller vanes.

4 Claims, 6 Drawing Figures

WIND MOTORS

This is the first division of application Ser. No. 484,148, filed 6-28-74. This application is identified especially to FIG. 1, FIG. 4, and FIG. 5, and the part of the specification that pertains to these drawings.

BACKGROUND OF THE INVENTION

1. Field of the Invention

1. Using the impact of the wind against an impeller wheel to provide mechanical or electric power.

2. Description of the Prior Art

1. There are two broad classes in the prior art. One class are those in which the impeller revolves at right angle to the direction of the wind and has vanes set at an angle on the impeller wheel that provides the wheel turning impulse by the reaction provided by the blades in deflecting the on-coming wind. Hundreds of thousands of this type have been made but very few developed more than one horsepower, in fact a five horse power wind motor of this type is called a large wind motor.

2. The other class are those that revolve in the same direction as the on-coming wind and resemble paddle wheels or certain types of water wheels, there are several types of these; one type has one half of the impeller vanes guarded from the action of the wind, for otherwise they will not revolve since the pressure on the two halves will balance; another type of this class uses folding vanes that close on themselves when they come into the counter pressure, also there is the screw vane type used extensively on top of buildings as ventilator motors, and also the "S-rotor" type wind motor which powered an ocean-going ship on a round trip from Europe to America.

SUMMARY OF THE INVENTION

The eternal winds cover the entire world and provide the most abundant source of power to be obtained for the benefit of mankind.

The material to make my wind motor has been available for hundreds of years, all that was lacking to tap this unlimited source of power was the conception of my practical wind motor, which can be made in very large sizes, has low cost per h.p. construction cost, is safe to operate, and efficient in all winds including mild winds.

The most important part of my invention is the wind gathering channel device, that preferably has a bottom and top side and a side at each end, the front of this wind channel device is spread out to gather a large quantity of the on-coming wind, the sides of this wind channel slope gradually inwardly to the outlet of the channel where the wind is directed against the vanes of the impeller with a multiplied impact.

DESCRIPTION OF THE PREFERRED EMBODIMENTS

Figure 1:
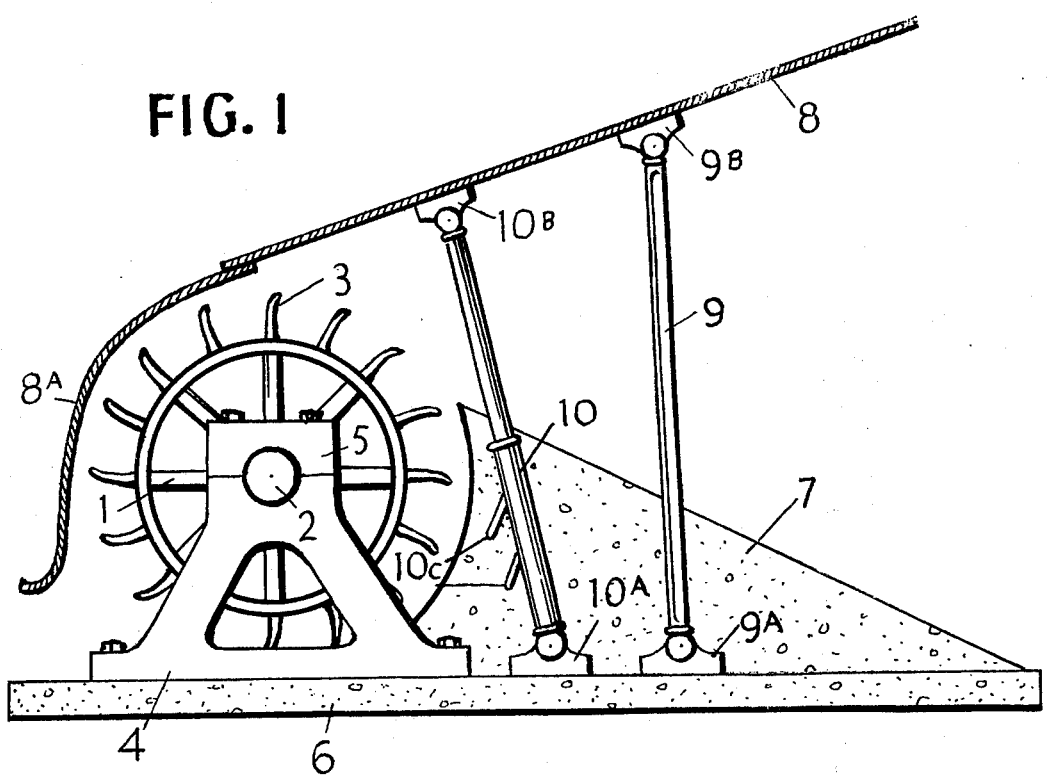
FIG. 1, shows an end view of this wind motor, No. 1 is the impeller rotor which is mounted on axis shaft 2, No. 3 denotes the impeller vanes or buckets, shaft 2 is journaled in bearings 5, which bearings are supported by structure No. 4, which structure is mounted on a firm base 6; No. 7 is an upwardly sloping mound which is preferably hard faced, No. 8 is the adjustable wind channel member directly above the upwardly sloping mound that gathers, holds, and directs the wind downward toward the impeller vanes, 9 is a supporting bar which is attached to bearing 9A which can be movable or locked into position, the top side bearing of supporting bar 9 is 9B, 10 is a hydraulic cylinder mechanism, 10A is the bottom bearing support for the hydraulic cylinder mechanism and it can be movable or locked into position, 10B is the top side bearing support for the hydraulic mechanism 10, 10C denotes hydraulic hose connections of hydraulic cylinder No. 10, 8 is an extending wind directing cover member which directs the wind down along the path of the impeller vanes.

FIG. 1, version would be satisfactory where the winds blow mostly from the same direction, such as in the arctic and antarctic regions, also in the prevailing trade wind zones, and on top of mountains or at high altitude where the anti-trade winds are found. This version could use the slope of a mountain or hill for wind gathering channel member 7 which could be several thousand feet wide and more than a mile long and rising several thousand feet higher at the top side than at the bottom side.

Also this FIG. 1, version could be made with member 7 not sloping upwardly from the front and having the front top side substantially on the same plane as the rear top of 7. On mountain tops and high plateaus where the wind is strong, only the top wind directing channel member No. 8 would be necessary.

The impeller rotor could be in excess of 1000 ft. in diameter. The top wind channel member 8 could have automatically controlled mechanism to lift up the back side and lower the front side to regulate the wind force striking the impeller vanes and also to divert the wind over the top of the impeller when necessary to protect the impeller from violent destructive winds.

Figure 2:
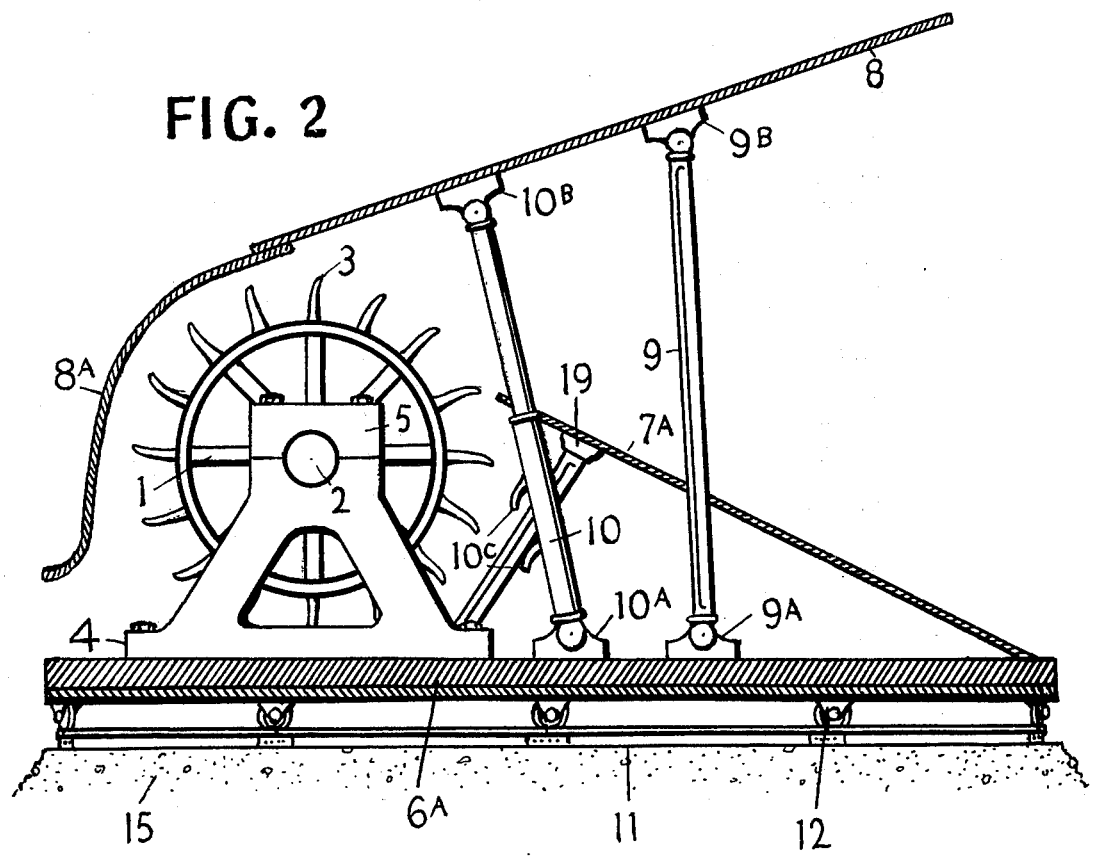
FIG. 2, has some of the same parts as FIG. 1, except the inclined frontal wind channel bottom side member which is denoted by 7A, which movable wind channel member is held in the correct place by adjustable support 19, No. 6 is preferable a wood or metal platform instead of a stationary base such as in FIG. 1, No. 15 is a base of some sturdy substance such as concrete which supports the circular path or track No. 11, wheel assemblies No. 12 are secured to the bottom side of movable platform 6A and the wheels roll on the circular path or rail 11 so that the wind motor can turn in all directions.

In FIG. 2, version is about the same as in FIG. 1, except it has a variable wind channel slope member 7A and the unit is also mounted on a platform with wheels underneath which are made to run on a circular track or circular hard-surfaced path. This unit could be pointed in any direction and held at any certain place by power driven mechanism.

This version could be made in large sizes such as a series of impeller rotors abreast with multiple stage impeller rotors, extending to or beyond 4,000 ft., with the first stage impeller rotors having a diameter of or in excess of a 1000 ft. The center of the unit could be at the center of a section of land with the outer track, for it would require several circular tracks, forming a circle of nearly a mile in diameter. A unit of this size on a section of land could produce more horse power with a 30 mile per hr. prevailing wind than the hydraulic power plants at Niagara Falls could produce.

Figure 3:
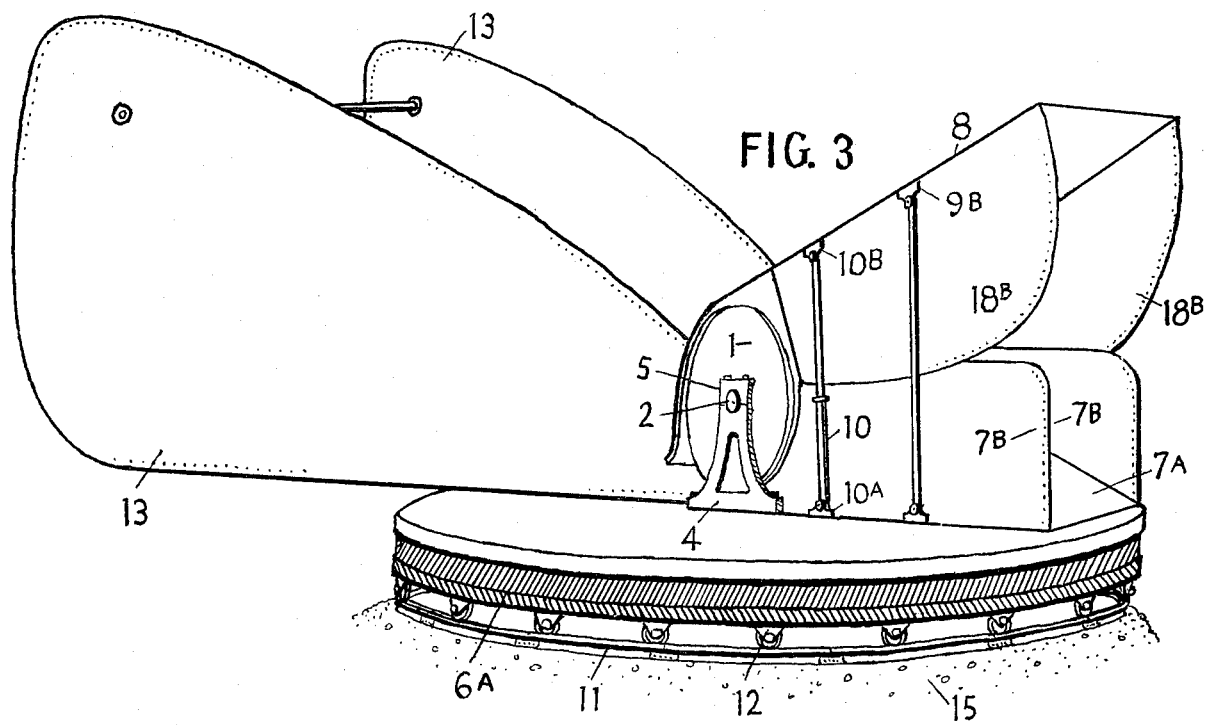
FIG. 3, shows a perspective view of the complete wind motor as in FIG. 2 with the addition of air rudder 13 and wind channel sides 7B of bottom wind channel member 7A, also the wind channel sides 18B of the top side wind channel member 8.

FIG. 3, version with rudder for holding the unit in correct position, is more adoptable for smaller units such as 10,000 H.P. and smaller.

Figure 4:
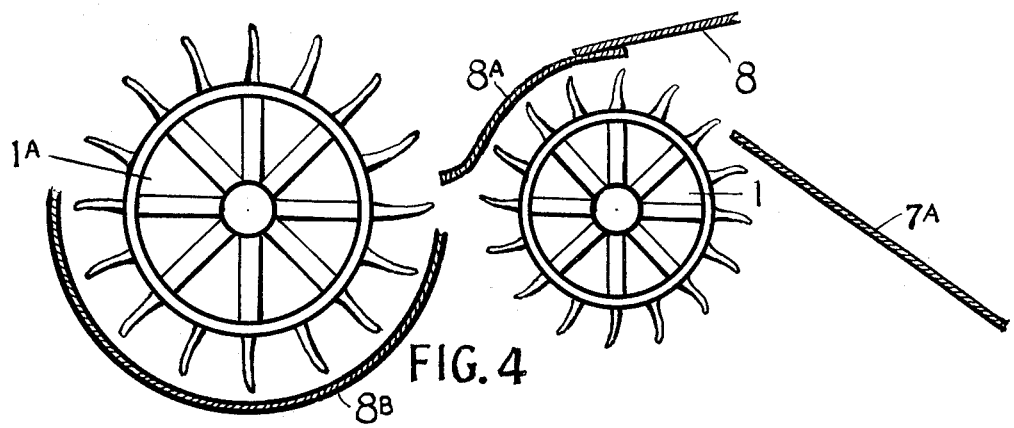
FIG. 4, shows two stages of impeller rotors, No. 1A is the second or low wind pressure member and 8B is the wind directing member at the bottom side of low pressure impeller rotor 1A.

FIG. 4, shows the multiple stage propeller wheels which show the second stage with a larger impeller rotor due to the lower pressure and slower wind which will be received in this stage. Multiple stages will be necessary in big units for maximum efficiency.

Figure 5:
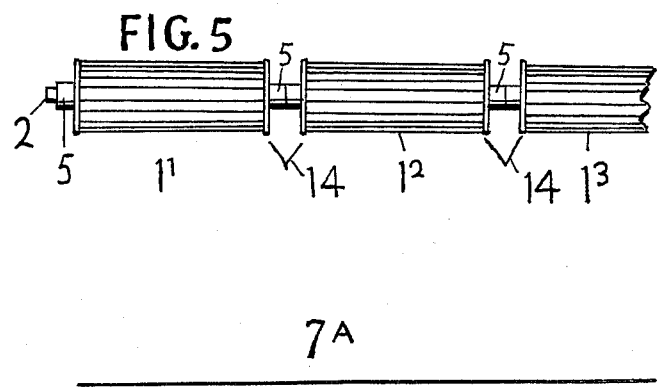
FIG. 5, shows impeller rotors abreast in series with bearings denoted by 5, deflection members 14 which are mounted preferably on the bottom inclined wind channel member 7A to deflect the on-coming wind to the right or left of the gap where the bearing is located.

FIG. 5, shows the impeller rotors in series abreast which embodiment would be necessary in very large units. The impeller rotors are shown comparable very small in relation to size of shaft and bearing assembly but actually these impeller rotors would be preferably very large in diameter so as to get the maximum torque from even a slow wind.

Figure 6:
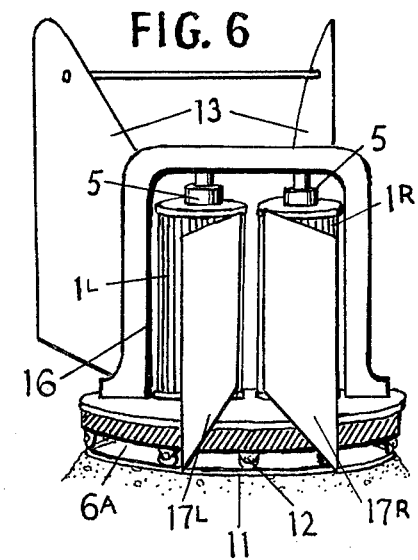
FIG. 6, shows the same wind motor but with vertical parallel abreast impeller rotors represented by 1L and 1R, 16 denotes the structure that supports the impeller shaft bearing 5 of each impeller rotor at the top sides, the base platform supports the bottom side bearings No. 5 of the impeller rotors, the wind channel main wind directing channel members are the two vertical members 17L and 17R, one impeller rotor could be used instead of two by adjusting the vertical wind channel left and right members at the inner side to direct the wind against the vanes of a single impeller rotor, top and bottom wind channel members which would prevent slip by of the wind are not shown in this drawing but should be included in this type wind motor to increase efficiency especially in the smaller size units.

FIG. 6, embodiment has two parallel and abreast impeller rotors but could have a series of parallel turn rotor units, which two rotors per unit would be more efficient, both from construction cost per h.p. and operating efficiency. This embodiment would be preferable on top of a building, ship, floating platform, mountain top, in fact any place where vertical space is more plentiful than horizontal space.

I claim:

1. A wind motor that is propelled by the impact of wind against a rotary impeller propulsion unit that travels in the same direction as the wind comprising in combination:
   a. a substantially horizontal rotary impeller propulsion unit preferably of large diameter which has propulsion vanes at the perimeter of the rotary impeller, this rotary impeller is mounted on an axis which is journaled by bearings at each end, which bearings are supported by structural supports whose bottom sides are secured to a sturdy base such as concrete;
   b. at right angle to the face of the rotary impeller and adjacent and directly in front of said propulsion rotary impeller is placed a slope which gradually rises from the front side to a level substantially just a little below the bottom of the vanes of the rotary impeller;
   c. also directly above and adjacent the bottom-side slope is a wind channel member which is substantially flat and whose forward end is preferably some distance above the top of the propulsion impeller rotor and whose rear end extends down to substantially just a little above the vanes of the rotary impeller;
   d. and the top wind directing channel member is pivoted and supported by a support member which preferably has at least one movable joint, the angle of slope of this channel member can be changed by means such as a hydraulic cylinder mechanism to regulate the pressure and volume of the wind against the vanes of the impeller to control speed of the wind motor and guard against destructive winds.

2. A wind motor that is propelled by the impact of wind against the vanes of an impeller rotor that travels in the same direction as the on-coming wind as in claim 1, further comprising:
   a. a shield that joins with the inner edge of the top side wind channel member to direct and hold the wind against the vanes at the top and back side of the impeller rotor;
   b. two vertical wind channels members one at each end of the wind directing channel to prevent flow-by of the wind at each respective end of the wind directing channel.

3. A wind motor that is propelled by the impact of wind against an impeller rotor that turns in the same direction as the on-coming wind comprising in combination:
   a. a substantially horizontal impeller rotor preferably of large diameter which has vanes at the perimeter, this impeller rotor is mounted on an axis which is journaled by bearings at each end, which bearings are supported by structural supports whose bottom sides are secured to a sturdy base such as concrete;
   b. the propulsion rotor would be located in a recess which would be deep enough to shield at least the bottom half of the front side of the propulsion impeller rotor, the bottom wind channel member which is at right angle to the face of the rotor and adjacent and directly in front of the impeller rotor could be substantially level;
   c. directly above and adjacent to the bottom wind channel member is the top side wind channel member whose forward end reaches out over and above the substantially level bottom wind-directing channel member below, the back side of this top side wind directing channel member slopes down to just substantially above the top side of the vanes of the impeller rotor;
   d. and the top wind directing channel member is supported by structural members secured to the ground below, this top wind-directing channel member is pivoted by the structural frame so that means such as a hydraulic cylinder mechanism can adjust the slope of the wind channel member to control the speed of the wind motor and guard against violent winds.

4. A wind motor that is propelled by the impact of wind against an impeller rotor that turns in the same direction as the on-coming wind as in claim 3, further comprising: a. a shield that joins with the inner edge of the top side wind channel member to direct and hold the wind against the vanes at the top and back sides of the impeller rotor;
   b. two vertical wind channel members, one at each end of the wind directing channel to prevent flow-by of the wind at each respective end of the wind directing channel.

* * * * *